Jan. 12, 1937.   M. S. LANDOW   2,067,716
MOLDING DEVICE
Filed July 2, 1935   2 Sheets-Sheet 1
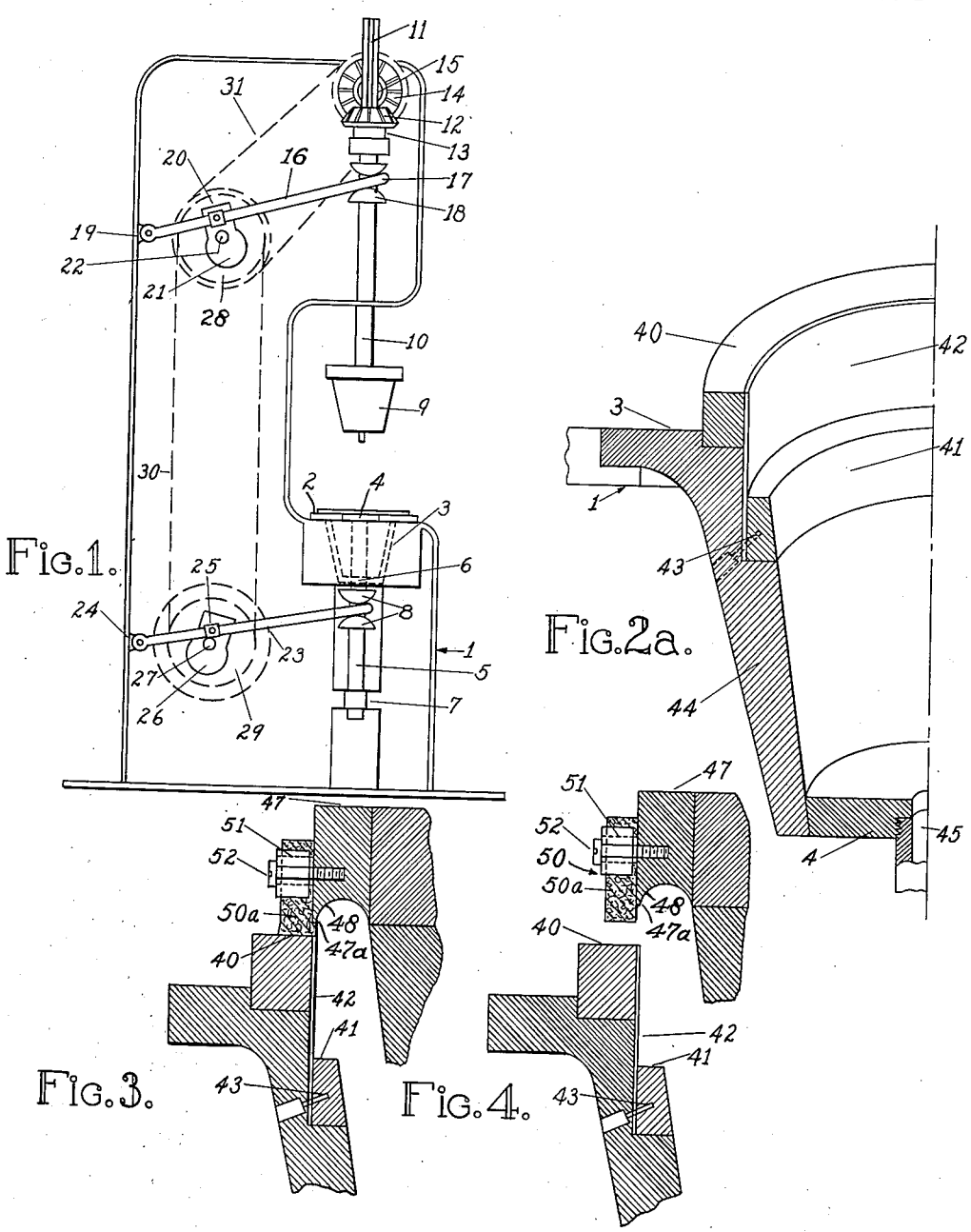
Inventor:
Myer S. Landow,
By Spear, Donaldson & Hall
Attorneys.

Jan. 12, 1937.  M. S. LANDOW  2,067,716
MOLDING DEVICE
Filed July 2, 1935   2 Sheets-Sheet 2

Inventor:
Myer S. Landow,
By Spear, Donaldson & Hall
Attorneys.

Patented Jan. 12, 1937

2,067,716

UNITED STATES PATENT OFFICE 2,067,716

MOLDING DEVICE

Myer S. Landow, York, Pa., assignor to The Pfaltzgraff Pottery Company, York, Pa.

Application July 2, 1935, Serial No. 29,532

11 Claims. (Cl. 25—26)

This invention relates to a device for forming bodies from plastic materials such as clay, paper maché, or other cementitious plastic compositions. The invention is particularly directed toward a molding device for producing containers or receptacles such as flower pots, bowls, jardinieres, and the like, from cementitious and ceramic materials.

Heretofore automatic machines for molding flower pots, bowls, and similar articles from plastic substances have been devised, in which a stationary female die and a rotating inner or male die were employed together with different types of scrapers. However, the product produced by these prior molding machines always exhibited an outwardly extending fin of excess clay or other plastic or cementitious material from which the article was being molded, this fin generally being produced at a point where the male and female dies came into almost direct contact.

Because of this fin, much suffering was caused in the manufacture of flower pots, bowls, jardinieres, and the like, as well as by the users of the finished product due to the lacerations received on the hands and fingers during the handling of the above mentioned products.

For this reason, after the molding operation, it was necessary to manually remove this fin of material, thereby materially adding to the cost of the finished product. In the manufacture of flower pots from clay, for example, it required the services of an additional man to treat the flower pots produced by a simple molding machine, these men being employed primarily for the removal of the fin formed where the male and female dies came all but in direct contact.

This invention has for its object the provision of means whereby objects of circular section such as bowls, flower pots, etc., may be molded automatically in one operation without producing an extended fin of the character described hereinabove, thereby obviating the necessity of removing such imperfections from the articles discharged by the molding machine and affording a completely molded article in but one operation.

It is the object of this invention to disclose and provide a molding device capable of automatically finishing all of the surfaces of an article being molded during the molding operation.

A still further object of this invention is to disclose and provide an automatic molding device in which provision is also made for the escape of excess plastic material from which the article being molded is composed and in which provision is also made for the elimination of any metal to metal contact between the male and female die portion of the molding machines.

These and other objects, uses and advantages of the invention will be disclosed and apparent to those skilled in the art from the following detailed description of one preferred form of the invention.

In the drawings

Figure 1 is a diagrammatic view of a suitable type of molding machine in connection with which the present invention may be employed.

Fig. 2a is a sectional perspective of the female mold constructed according to this invention.

Fig. 3 is a detail view on somewhat larger scale than Fig. 2 showing the molds in closed position with the flexible extensions of the male finishing ring pressed through the opening between the dies to form a part of the finishing wall of the dies.

Fig. 4 shows the parts of Fig. 3 in separated position.

Figure 2:
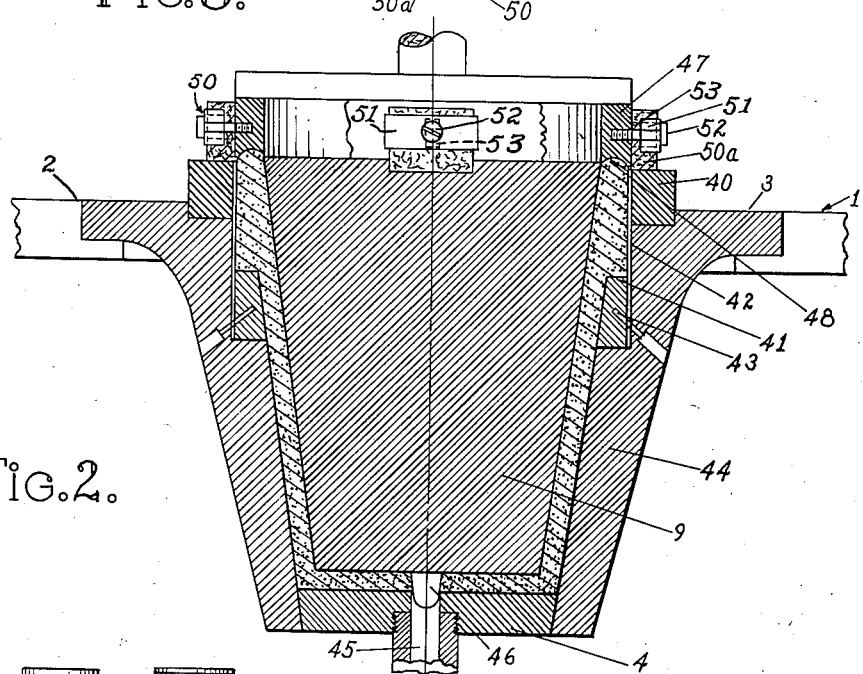
Fig. 2 is a sectional view of the mold and spinner constructed according to the invention.

The invention may be applied to numerous types of automatic molding machines, but for the purpose of illustration, reference will be had to a form of automatic molding device shown in Figs. 1 and 2 of the appended drawings. It is to be understood, however, that the invention is not limited in its application to this particular form of automatic molding machine.

As shown in Figure 1, the automatic molding machine may include a suitable exterior housing 1 provided with a working table 2 in which the female die 3 is positioned. The dies shown in the drawings are adapted to produce flower pots. The bottom portion of the female die 3 may be provided with a bottom member 4 mounted upon a vertical spindle 5 rotatably held in suitable bearings 6 and 7. The spindle 5 may be provided with a pair of spaced circular stops 8. Positioned centrally above the female die 3 is a male die 9, such male die being mounted upon the lower end of a shaft 10 whose upper section is provided with a longitudinal keyway 11. Keyed upon the shaft 10 may be a miter gear 12 held in a suitable bearing 13 connected to the frame 1 of the machine. The miter gear 12 may be driven by another miter gear 14 mounted upon a suitable shaft 15 journaled in the frame 1. In this manner, rotation may be imparted to the shaft 10 and such shaft move longitudinally at the same time.

Longitudinal motion may be imparted to the shaft 10 and to the spindle 5 in any suitable manner. As shown in the device illustrated in Fig. 1, however, such longitudinal motion may be imparted to the shaft 10 by means of a lever arm 16 terminating in a yoke or fork 17 adapted to embrace the shaft 10 between the spaced circular stops 18 carried by shaft 10. The lever arm 16 may be pivoted to the frame 1 at 19 and may slidably pass through a sleeve 20 carried eccentrically upon a counterweighted crank 21 mounted upon a shaft 22. Rotation of the crank 21 will therefore cause an oscillating action in the lever 16, which oscillating action results in a reciprocating longitudinal movement of the shaft 10. A similar reciprocating action may be imparted to the spindle 5 as by means of a lever 23 pivoted to the frame 1 at 24 and slidably passing through a sleeve 25 rotatably connected to crank 26 mounted upon a shaft 27.

The shafts 22 and 27 are preferably rotated in unison. The shaft 22 may be provided with a sprocket wheel 28 and the shaft 27 provided with a sprocket wheel 29, these sprockets being connected together by means of a roller chain 30. Either of these shafts 22 or 27 may be the driven shaft, means for driving same not being shown. The shaft 22 may also be coupled as by means of a chain 31 with the shaft 15, thereby driving the miter gear 14 and imparting rotation to the shaft 10.

Preferably, the cranks 21 and 26 are so set that the bottom plate member 4 is depressed and reaches the proper point in the bottom of the female die 3 in advance of the male die 9 and the male die 9 is withdrawn from the female die 3 before the bottom member 4 is raised. By adjusting the relative lengths of the arms and levers 16 and 23 and the relative lengths and positions of the cams or cranks 21 and 26, any desired phase relations between the male die 9 and the bottom plate 4 may be obtained.

As shown in Figs. 2 and 2a the female die 3 may be provided with a finishing ring 40, an inwardly extending shoulder 41 adapted to form the lower edge of the rim of the flower pot. This shoulder 41 also being part of ring that holds in place a band of annealed steel 42 which forms the outer surface of the rim of the flower pot. Said shoulder ring 41 being fastened by pins 43. The downward extending conical body portion 44 makes up the remainder of the female die. The bottom member 4 may fit into the lower end of the female die and be provided in the center with an aperture 45 adapted to receive the point 46 carried by the bottom of the male die 9.

The male die 9 may be substantially a truncated cone in form and may be provided at its upper end with a finishing ring 47, said finishing ring forming an outwardly extending curved rim or finishing wall 48 adapted to form the upper edge of the pot.

In normal operation, the outer lower edge 47a of the finishing ring 47 of the male die does not contact with the finishing ring or collar 40 of the female die but instead an aperture is left therebetween so that excess clay or other plastic, cementitious, or ceramic material placed in the female mold may be expressed during the molding operation through such aperture. It is this excess material which forms an outwardly extending lip or fin (Fig. 10) near the upper edge of the finished molded article. If the male finishing ring 47 were to rest directly on the finishing ring 40 of the female die, a great deal of wear and damage would there take place and furthermore excess quantities of clay or other plastic would be expressed from between the male and female dies with great difficulty.

In order to prevent the formation of the fin at the upper portion of the molded article and at a point corresponding to the aperture between the finishing ring 47 of the male die and shoulder 40 of the female die, the molding device of this invention includes a plurality of finishing ring extensions 50 projecting from the male die finishing ring 47 and in spaced relation to each other. In the embodiment shown, these extensions include a soft, resilient, flexible, yielding material 50a such as rubber, rubber composition, felt, or other suitable similar substance.

In the embodiment shown in Fig. 2, the finishing ring extensions 50 also include a metal guard 51 and a screw 52 holding the yielding portions 50a in place. The resilient yielding portions 50a of the finishing ring extensions 50, extend downwardly below the lower edge 47a of the male finishing ring 47 a distance greater than the opening left between the edge 47a of the male die and ring 40 of the female die, when the male die is in its down position, so that the yielding members 50a come in contact with the shoulder or finishing ring 40 of the female die before the male die 9 has reached its extreme low position in its downward stroke.

In order to compensate for wear, the yielding portions 50a of extensions 50 may be adjustably positioned therein and for this purpose a slot 53 may be formed in the yielding members 50a so as to permit their adjustment beneath the guards 51.

As has been stated hereinbefore, the finishing ring extensions 50 are spaced circumferentially around the finishing ring 47, thereby permitting excess clay or other plastic material to be extruded from the mold and from the space between the male and female dies.

Figure 9:
Fig. 9 is a reduced view of an article completely finished by means of the present invention as distinguished from the article of Fig. 10 having a rim or fin as made according to other methods and means employed heretofore.
Figure 10:

Referring to Fig. 4, as the yielding portions 50a of the finishing ring extensions 50 are protruding downwardly below the finishing ring 47 of the male die a greater distance than the aperture that is left when the male die is in its final down position, said yielding portions 50a will come in contact with the shoulder or finishing ring 40 of the female die before the final down position of the male die is reached. Therefore, when the male die continues downward, the portions 50a will be compressed and forced to spread into the aperture between the male and female dies as shown in Fig. 3. This will form an even surface on the inner side of the finishing 47 of the male die and the shoulder or finishing ring 40 of the female die, the articles being molded smooth by the even surface of the male finishing ring, compressed yielding portion 50a, and the female shoulder or finishing ring. The soft yielding portions 50a which have spread and flowed through the aperture, underlie and, in effect, constitute downward continuations of the finishing wall 48 at the inner side of the edge 47a of the upper finishing ring 47 and act as such in the finishing of the molded article. This is shown particularly in Figs. 3 and 8. In this manner the articles discharged from the mold are completely finished (as in Fig. 9) and do not exhibit the fin or rim as has been the case heretofore (Fig. 10). Furthermore, the life of the dies is prolonged as no metal to metal contact is established and the annealed steel band 42 inserted in the shoulder of the female die is highly wear resisting, keeping the inner surfaces of the closed dies at the point of the yielding member contact an even and smooth surface.

It will be understood that the yielding members 50a are not wipers in the ordinary sense, but constitute portions or extensions of the wall of the male die, the inner surfaces of the spread lower ends of these yielding members which extend through the aperture being in alignment with the finishing surfaces of the finishing rings of the male and female dies so that there will be no fin of material left projecting from the article when this is drawn from the mold.

It will be noted that the ring of the male or spinner die when the latter is in its lowermost position within the female die is spaced apart a substantial distance away from the ring of the female die, and that the upper ring adjacent the mold cavity has a substantially flat or horizontal lower edge face 47a overlying the surface of the ring of the female die or the metal lining 42 thereof and defines the upper limit of the space between the rings. The resilient portions or members 50a, when the finishing rings are in separated position, extends below the upper finishing ring a distance greater than the space between the rings in final finishing position. The lower portion of each resilient member under pressure of the rings in finishing position enters this substantial space and underlies the flat edge face 47a of the upper ring, and forms an underlying continuation of the finishing wall of male die ring.

It will be noticed further that the distortion of the yielding member laterally or into the substantial space mentioned takes place at the extreme lower part of said yielding member where it contacts with the ring of the lower or female die.

Figure 6:
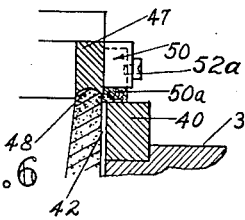
Figs. 6 and 7 are partial sectional and plan views respectively of a modification.
Figure 7:
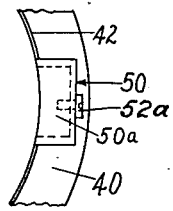

The invention also contemplates a construction in which the upper finishing ring 47 has extensions formed integral therewith in one piece, the integral extensions having openings or recesses therein in which are located the yielding portions 50a of the finishing ring, held by screw 52a as shown in Figs. 6 and 7.

Figure 8:
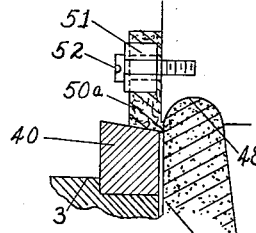
Fig. 8 is a view of a modification.
Figure 5:
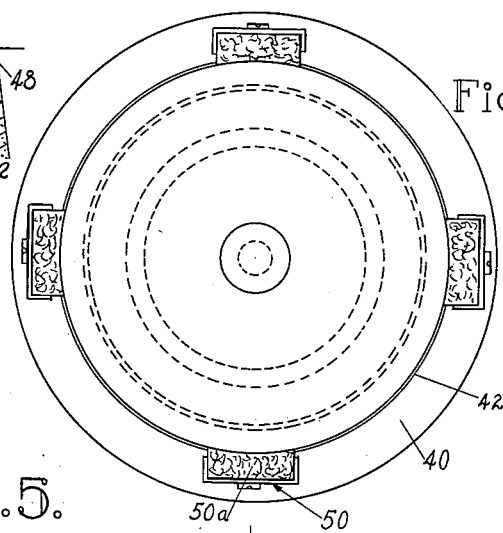
Fig. 5 is a top plan view of the upper part of Fig. 2.

The invention also includes a form in which the lower finishing ring 40 has its upper surface inclined upwardly from its inside toward its outside, as shown in Fig. 8. In this form the low point of the inclined upper face of the ring 40 is at the inside at the aperture and the high point is at the outside. This face inclining downwardly toward the aperture has a tendency to assist in retaining the yielding portions in place in the aperture as effective downward continuations of the wall of the upper finishing ring. When this inclined face is employed, less clamping force need be applied to the yielding material to cause it to flow or squeeze into the aperture to form a downward extension of the upper finishing ring and to act as a positive finisher of the molded article.

It will be understood that the method of forming the finishing ring extensions on the male die and the method of adjustably positioning the yielding portions therein may be very materially changed without departing from the scope of this invention. Furthermore, as has been stated hereinbefore, the construction of the automatic molding machine may also be materially changed. All such changes and modifications as come within the scope of the appended claims are embraced thereby.

I claim:

1. Apparatus of the class described including an upper finishing ring and a lower finishing ring substantially spaced apart in finishing position, said upper finishing ring having lateral extensions including yielding portions extending through the space between the rings in finishing position and forming an effective downward continuation of the finishing wall of the body of said upper finishing ring in alignment with the interior finishing surfaces of the finishing rings to thereby constitute a positive finisher of the molded article.

2. Apparatus according to claim 1 in which said yielding portions are of a length to extend below the lower edge of said upper finishing ring a distance greater than said space so that in finishing position the yielding portion is compressed against the upper surface of the lower finishing ring, said upper surface being constructed to direct free and unobstructed lateral flow or displacement of said yielding portion into and through said space under compression in finishing position.

3. Apparatus according to claim 1 in which said extensions include clamping means applying pressure to said yielding portions to cause them to flow and to extend through said space.

4. Apparatus according to claim 1 in which the upper surface of the lower finishing ring, against which the said yielding portions bear, is substantially plane.

5. Apparatus according to claim 1 in which the upper surface of the lower finishing ring, against which the said yielding portions bear, is inclined downwardly and inwardly toward said space.

6. Apparatus according to claim 1 in which said extensions are formed integral with said upper finishing ring and in one piece therewith, said integral extensions having openings therein, and said yielding portions being disposed in said openings.

7. In apparatus of the class described, a female die having a finishing ring, a male die having a finishing ring, said finishing rings when the dies are in working position being substantially spaced apart, and a resilient member carried by the male die and projecting normally a greater distance beyond the male finishing ring than the depth of the space between said rings when in working relation, said resilient material being squeezed through said space between the rings in working relation to form a part of the molding surface as an extension of the wall of the male finishing ring in alignment with the interior finishing walls of the finishing rings, substantially as described.

8. In apparatus of the class described, a female die having a finishing ring, a male die having a finishing ring, a metal lining mounted on the upper interior surface of the wall of the female die, the upper portion of said metal lining forming an inward continuation of the finishing ring of the female die, the inner face of said metal lining being in alignment with the finishing face of the male finishing ring.

9. In apparatus according to claim 8, a ring retaining said metal lining in place in the female die, and means fastening said retaining ring to the female die, said ring providing a shoulder in said die to form the lower edge of the rim of the molded article.

10. Apparatus of the class described comprising an upper finishing ring and a lower finishing ring definitely spaced apart in finishing position to permit material to be extruded between throughout a substantial portion of their circumference, a member of yielding material carried on the exterior of the upper ring and extending downwardly therefrom to rest on the upper surface of the lower ring and having its extreme lower portion extending inwardly into part of the space between the upper and lower rings and terminating with its inner face in the vertical plane in which the inner surfaces of the upper and lower rings lie to act with its inner face upon the outer surface of the article being formed, preventing extrusion of material at the successive locations which it occupies in the relative rotation of the parts and removing the excess material extruded in advance of it, substantially as described.

11. Apparatus of the class described comprising upper and lower finishing rings substantially spaced apart in finishing position, a member of yielding material mounted exteriorly of and on one ring and squeezed into the space between the rings with its inner face forming a flush continuation of the inner faces of the rings, said rings having relative rotation, and said member preventing extrusion of the material between the rings at the places where it is located in its relative movement circumferentially of the article and removing the fin which is extruded at other points between the rings, said removal taking away the extruded material clear up to the exterior surface of the article being formed, substantially as described.

MYER S. LANDOW.